United States Patent
Kobashi

(10) Patent No.: US 8,773,711 B2
(45) Date of Patent: Jul. 8, 2014

(54) DATA PROCESSING APPARATUS, DATA PROCESSING METHOD, AND STORAGE MEDIUM FOR CONTROLLING DISPLAY SETTING SCREEN BASED ON SELECTED PRINTER DRIVER

(75) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 12/840,133

(22) Filed: Jul. 20, 2010

(65) Prior Publication Data

US 2011/0026077 A1 Feb. 3, 2011

(30) Foreign Application Priority Data

Jul. 29, 2009 (JP) ................................ 2009-176613

(51) Int. Cl.
*H04N 1/60* (2006.01)

(52) U.S. Cl.
USPC .......... 358/1.9; 358/1.13; 358/1.14; 358/1.15; 358/1.16

(58) Field of Classification Search
CPC .... G06F 3/1205; G06F 3/1255; G06F 3/1285
USPC ........................................ 358/1.13–1.16, 1.9
See application file for complete search history.

(56) References Cited

U.S. PATENT DOCUMENTS

| | | | |
|---|---|---|---|
| 2002/0069228 A1 | 6/2002 | Mori et al. | |
| 2003/0053106 A1* | 3/2003 | Kuroda et al. | 358/1.13 |
| 2004/0190057 A1* | 9/2004 | Takahashi et al. | 358/1.15 |
| 2005/0200881 A1* | 9/2005 | Yamade | 358/1.14 |
| 2006/0158674 A1* | 7/2006 | Mizoguchi | 358/1.13 |
| 2006/0221372 A1* | 10/2006 | Onishi et al. | 358/1.13 |
| 2007/0211276 A1* | 9/2007 | Toda | 358/1.13 |
| 2008/0007758 A1* | 1/2008 | Miyashita | 358/1.14 |
| 2008/0144087 A1* | 6/2008 | Mitsui | 358/1.15 |
| 2009/0059274 A1* | 3/2009 | Tomita | 358/1.15 |

(Continued)

FOREIGN PATENT DOCUMENTS

| | | |
|---|---|---|
| JP | 2002-200814 A | 7/2002 |
| JP | 2003-162388 A | 6/2003 |
| JP | 2008-310495 A | 12/2008 |
| JP | 2009-054006 A | 3/2009 |

OTHER PUBLICATIONS

Office Action issued on Aug. 20, 2013 in counterpart Japanese Patent Application No. 2009-176613.

*Primary Examiner* — Benny Q Tieu
*Assistant Examiner* — Quyen V Ngo
(74) *Attorney, Agent, or Firm* — Carter, DeLuca, Farrell & Schmidt, LLP

(57) ABSTRACT

A data processing apparatus including an application for setting print setting information and printer drivers for generating a print job includes a selection unit configured to select a printer driver and a display control unit configured, if a printer driver that cannot generate a print job for outputting a print product reflecting the print setting information set by the application is selected, to display a setting screen that does not include setting items for which whether the set print setting information is reflected in the print product depends on a printer driver type, while if a printer driver that can generate a print job for outputting a print product reflecting the print setting information set by the application is selected, to display a setting screen that includes setting items for which whether the set print setting information is reflected in the print product depends on the printer driver type.

18 Claims, 13 Drawing Sheets

(56) References Cited

U.S. PATENT DOCUMENTS

| | | | |
|---|---|---|---|
| 2009/0109473 A1* | 4/2009 | Kato | 358/1.15 |
| 2009/0128849 A1* | 5/2009 | Sakura | 358/1.15 |
| 2009/0180140 A1* | 7/2009 | Kawamura | 358/1.15 |

* cited by examiner

DATA PROCESSING APPARATUS, DATA PROCESSING METHOD, AND STORAGE MEDIUM FOR CONTROLLING DISPLAY SETTING SCREEN BASED ON SELECTED PRINTER DRIVER

BACKGROUND OF THE INVENTION

1. Field of the Invention

The present invention relates to a data processing apparatus and a data processing method configured to transmit data to an image processing apparatus and a program therefor.

2. Description of the Related Art

A conventional data processing apparatus performs printing of a print job, which is generated by using a printer driver, by transferring the print job to a multifunction peripheral (MFP). Japanese Patent Application Laid-Open No. 2002-200814 discusses a method for setting print setting information that can be set by a printer driver, such as a stapling setting, a punching setting, and a bookbinding setting, by using an application for effectively setting various setting functions of the printer driver.

As described above, print setting information to be set by the printer driver can be set by using an application. However, depending on difference in manufacturer of the application and the printer driver, or difference in old and new of version information of the application or the printer driver, the printer driver may not be capable of appropriately receiving print setting information set by the application.

As a result, if a user instructs stapling by using the application, the printer driver cannot appropriately receive the user instruction. Therefore, a print product desired by the user may not be output. Despite this, if a setting item for setting the print setting information that the printer driver cannot appropriately receive is displayed on a setting screen of the application, the user may get confused.

In addition, a type of printer driver-dependent print setting information that the application can comply with may be different from a type of the print setting information that can be set by the printer driver. In this case, the print setting information that can be verified on the application may be different from the print setting information actually set by the printer driver. Accordingly, the user may get confused.

SUMMARY OF THE INVENTION

According to an aspect of the present invention, a data processing apparatus including an application for setting print setting information and a plurality of printer drivers configured to generate a print job includes a display control unit configured, when the application is executed and if a printer driver that cannot receive the print setting information set by the application is selected, to display a setting screen that does not include a setting item which depends on a printer driver, while if a printer driver that can receive the print setting information set by the application is selected, to display a setting screen that includes a setting item which depends on a printer driver, and a setting unit configured to set the print setting information according to an instruction received via a setting screen displayed by the display control unit due to execution of the application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
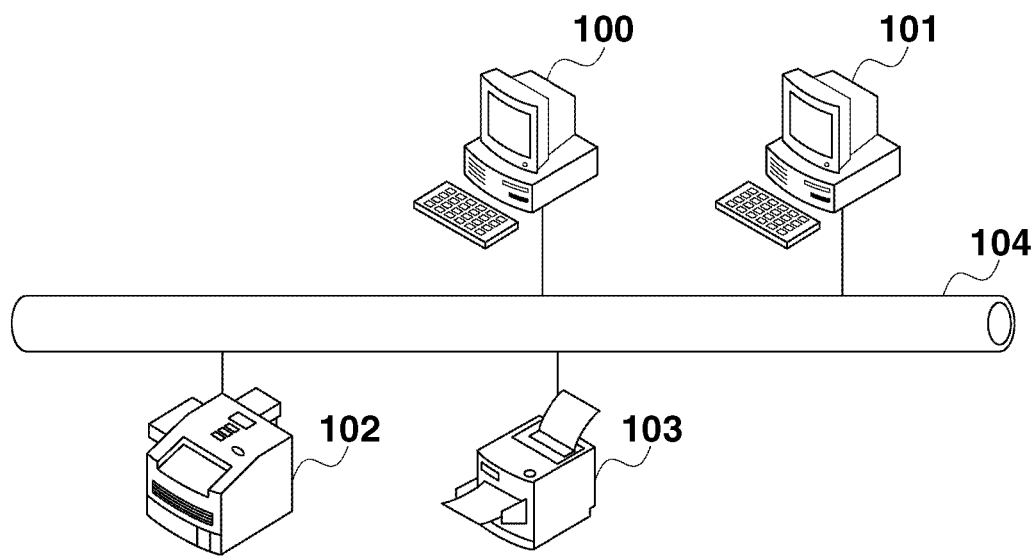
FIG. 1 illustrates an exemplary configuration of a data processing system.

FIG. 1 illustrates an exemplary configuration of a data processing system according to a first exemplary embodiment of the present invention. The data processing system includes data processing apparatuses and image processing apparatuses which are in communication with one another via a network.

Referring to FIG. 1, data processing apparatuses 100 and 101 transmit a print job to image processing apparatuses 102 and 103. Each of the image processing apparatuses 102 and 103 is an MFP having various functions, such as a print function, a copy function, a facsimile function, a scanner function, and a file transmission function.

A predetermined operating system (OS) and various applications are installed on the data processing apparatuses 100 and 101. In the present exemplary embodiment, the data processing apparatuses 100 and 101 are an information processing apparatus that functions as a host computer. In addition, the data processing apparatuses 100 and 101 includes an integrated application which integrally includes various functions.

In the present exemplary embodiment, the integrated application includes various functions, such as a printing cost reduction function, an information management function, a function for improving facsimile transmission and reception operations, a function for improving an efficiency of converting paper documents into electronic formats, and a function for setting print setting information. Accordingly, the integrated application is also referred to as a "print setting application".

Figure 2:
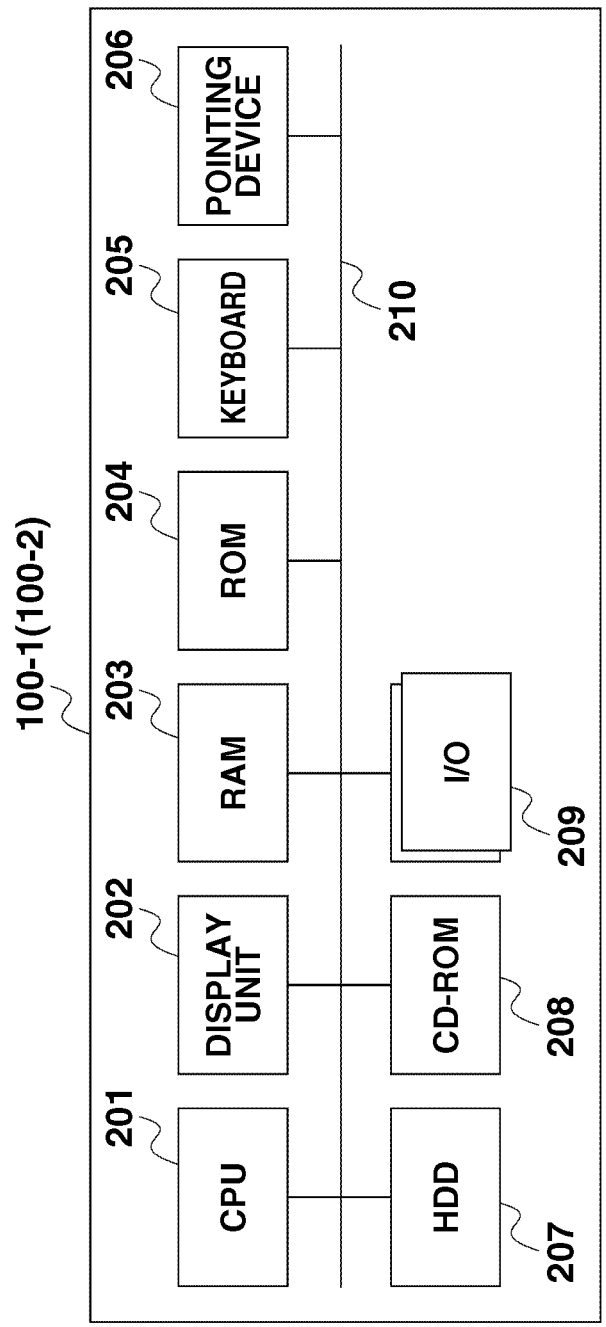
FIG. 2 illustrates an exemplary hardware configuration of a data processing apparatus.

FIG. 2 illustrates an exemplary hardware configuration of the data processing apparatuses 100 and 101 illustrated in FIG. 1. Referring to FIG. 2, input devices used for inputting a user operation, i.e., a keyboard 205, and a pointing device 206 are connected to the data processing apparatus.

In addition, the data processing apparatuses 100 and 101 include a display unit 202 for displaying output information. Further, the data processing apparatuses 100 and 101 include storage devices for storing various programs and job execution information which are used in executing processing according to the present exemplary embodiment. The storage devices include a random access memory (RAM) 203, a hard disk drive (HDD) 207, a read-only memory (ROM) 204, and a compact disc-read only memory (CD-ROM) 208.

In addition, the data processing apparatuses 100 and 101 include an interface (I/F) device input/output (I/O) unit 209 which is an interface for communication with an external apparatus, and a central processing unit (CPU) 201 which executes a program. A method for connecting to an external apparatus can be either wired or wireless. It is also useful if the data processing apparatuses 100 and 101 are connected to the image processing apparatus 102 via the external apparatus connection I/F (the I/F device I/O 209).

Figure 3:
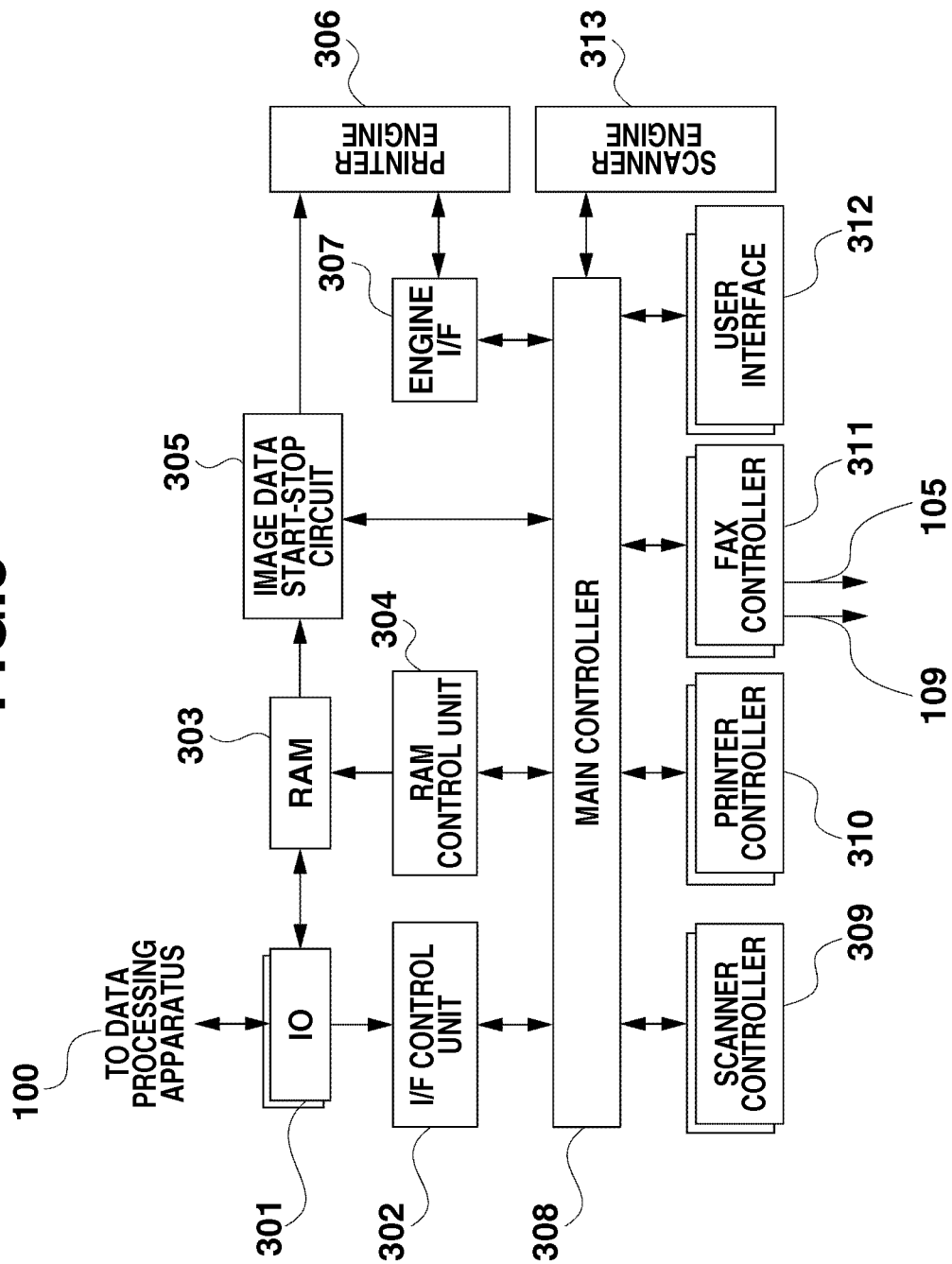
FIG. 3 is a block diagram illustrating an exemplary hardware configuration in an image processing apparatus.

FIG. 3 is a block diagram illustrating an example of a hardware configuration in the image processing apparatus 102 illustrated in FIG. 1. The example of the image processing apparatus 102 illustrated in FIG. 3 is an MFP having the scanner function, the print function, and the facsimile function.

The image processing apparatus 102 is in communication with the data processing apparatuses 100 and 101 via a communication medium, such as a network (local area network (LAN)) 104, via an I/O unit 301. In order to comply with a plurality of types of communication methods, the image processing apparatus 102 may include a plurality of I/O units 301. The image processing apparatus 102 transfers a device identification (ID) and a scan image to the data processing apparatus 100 via the I/O unit 301.

In addition, the image processing apparatus 102 receives various types of control commands from the data processing apparatuses 100 and 101 and executes processing according to the received control command. An I/F control unit 302 issues a device ID to processing units included in the image processing apparatus 102, such as a scanner, a printer, or a facsimile unit. A RAM 303 is a primary storage device which stores external data, such as a control command acquired by the I/O unit 301 and an image read by using a scanner engine 313. Further, the RAM 303 stores an image rasterized by a printer controller 310 which is an image before being transferred to a printer engine 306. The RAM control unit 304 controls the RAM 303.

An image data start-stop circuit 305 outputs the image rasterized on the RAM control unit 304 which is input or scanned by using the printer controller 310 and the scanner engine 313, in synchronization with rotation of the printer engine 306. The printer engine 306 develops the image on an output medium, such as a paper sheet.

A main controller 308 controls the printer engine 306 using an engine I/F 307. In addition, the main controller 308 receives control information from the data processing apparatuses 100 and 101 via the I/O unit 301 and notifies a scanner controller 309, the printer controller 310, and a fax controller 311 of the received control information.

In addition, the main controller 308 receives an instruction issued from each controller and a user interface 312 and controls the printer engine 306 and the scanner engine 313 according to the received instruction. Further, the main controller 308 acquires a device ID of an expansion controller from each controller and manages the acquired device ID.

The scan controller 309 converts a scan control command received from the data processing apparatuses 100 and 101 into an internal executive instruction that the main controller 308 can interpret. In addition, the scan controller 309 converts an image read by the scan engine 313 into a scan control command.

The printer controller 310 converts a print job received from the data processing apparatuses 100 and 101 into an internal executive instruction including a raster image that the main controller 308 can interpret. The raster image is transferred to the printer engine 306 and is printed on an output medium, such as a paper sheet, by the printer engine 306.

The fax controller 311 converts a facsimile control language received from the data processing apparatuses 100 and 101 into a raster image and transfers the raster image to another facsimile transmission apparatus via a public line or the Internet. The user interface 312 is used as an input/output unit for inputting and outputting an instruction input by the user.

The scanner engine 313 reads an image of a printed document using an optical device according to an instruction from the main controller 308. Further, the scanner engine 313 converts the read document image into an electrical signal and transfers the signal to the main controller 308.

Figure 4:
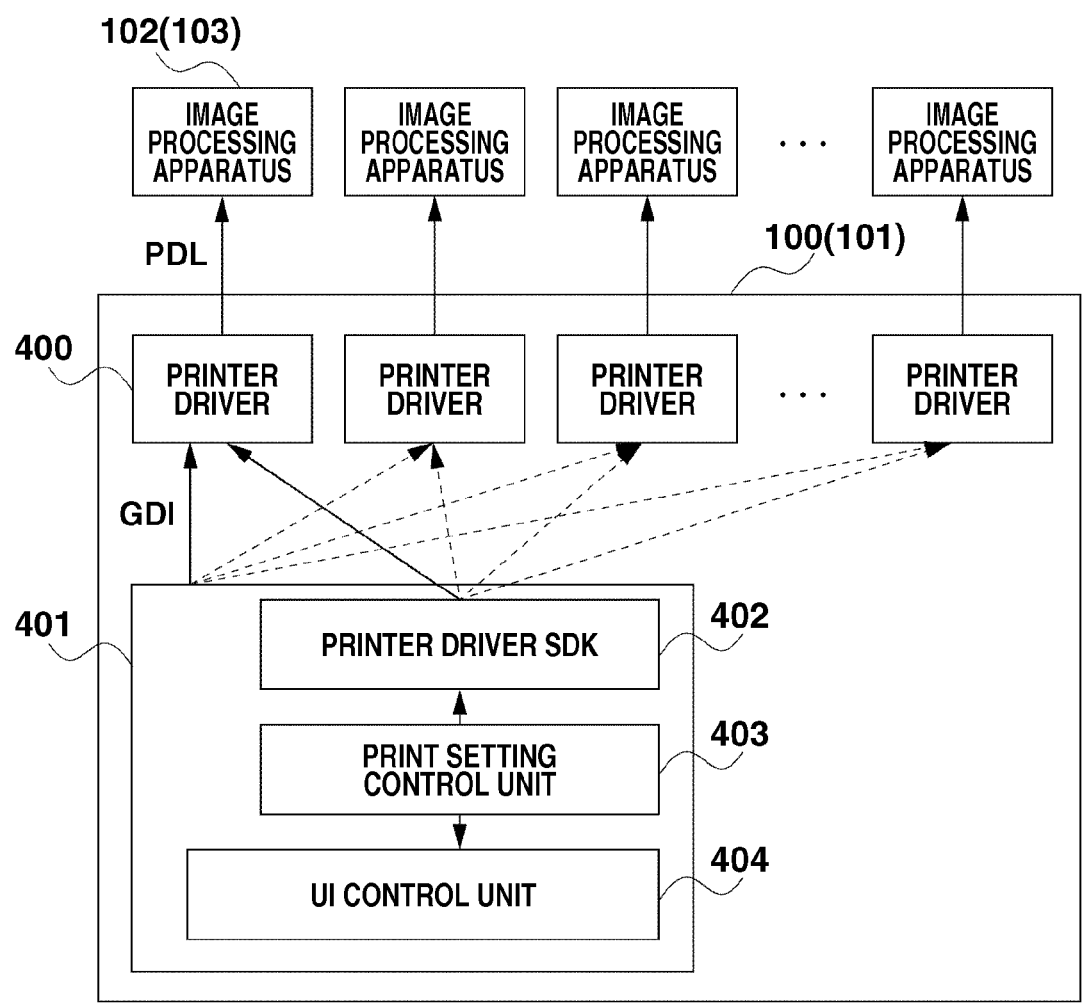
FIG. 4 is a block diagram illustrating an exemplary software configuration of the data processing apparatus.

FIG. 4 is a block diagram illustrating an exemplary software configuration of the data processing apparatuses 100 and 101 illustrated in FIG. 1.

Referring to FIG. 4, a printer driver 400 generates a print job (page description language (PDL) data) having a format that the image processing apparatus 102 can interpret. The printer driver 400 is installed to the HDD 207 as a system application.

An integrated application 401 includes a UI that enables the user to execute various functions described above. The integrated application 401 executes processing corresponding to each function according to a user instruction. The integrated application 401 includes a plurality of components 402 through 404.

More specifically, a printer driver software development kit (SDK) 402 includes I/Fs for acquiring print setting information from the printer driver 400 and setting print setting information to the printer driver 400. The printer driver SDK 402 is used for editing the print setting information set to the printer driver 400 by using the integrated application 401 without using the UI of the printer driver 400.

A print setting control unit 403 sets the print setting information input by the integrated application 401 to the printer driver 400 using the printer driver SDK 402. In addition, if it is necessary to change another print setting information on the integrated application 401 side, the print setting control unit 403 instructs a UI control unit 404 to change the print setting information.

If, for example, stapling cannot be set to an output sheet having a size changed by the integrated application 401, the print setting control unit 403 instructs the UI control unit 404 to disable the stapling setting. The UI control unit 404 controls the entire user interfaces managed by the integrated application 401. In the present exemplary embodiment, the UI control unit 404 is also referred to as a "display control unit".

Now, processing for selecting a printer driver 400, which is executed by the data processing apparatuses 100 and 101, will be described in detail below with reference to FIGS. 5 through 8.

Figure 5:
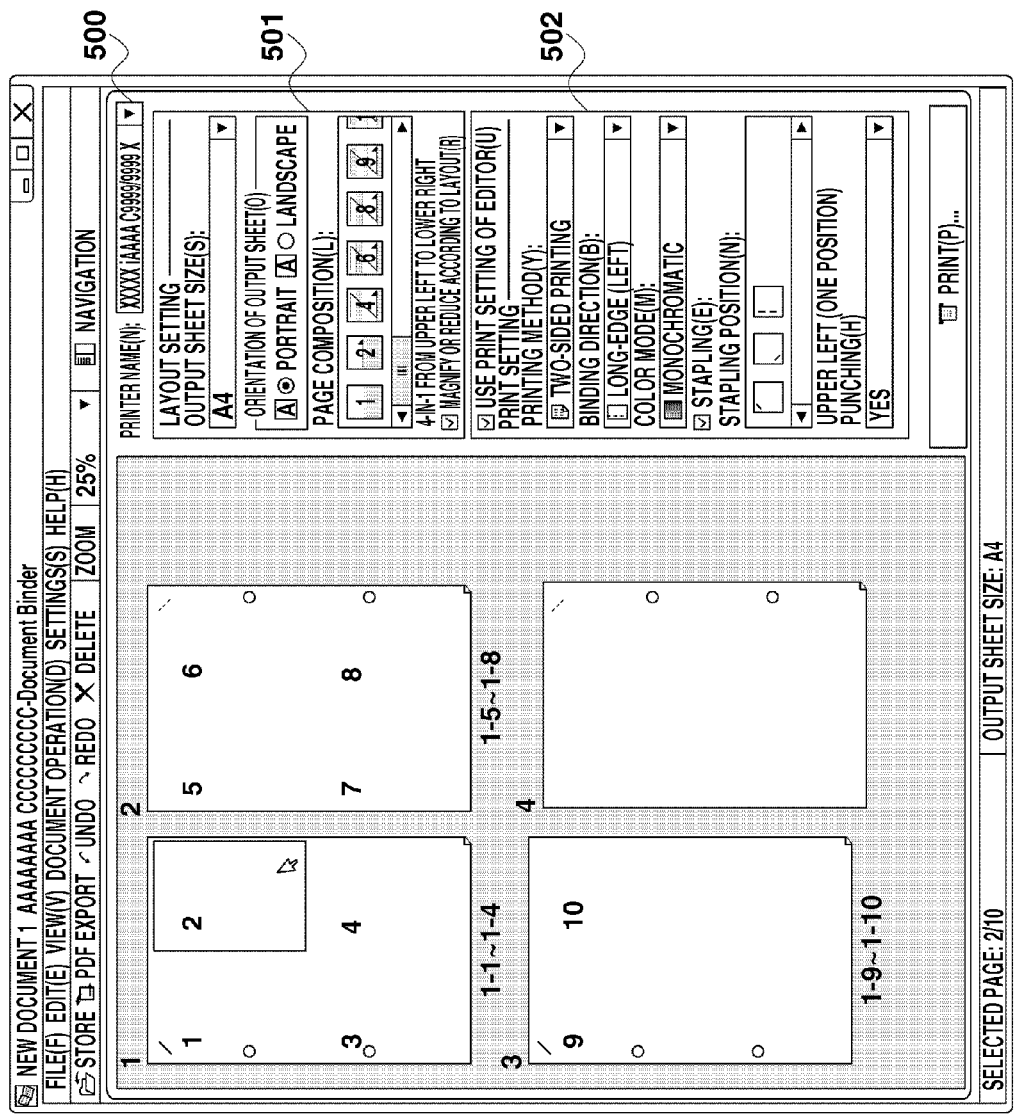
FIG. 5 illustrates an example of a user interface (UI) that can be displayed by the data processing apparatus.

FIG. 5 illustrates an example of a user interface (setting screen) that can be displayed by the data processing apparatuses 100 and 101 illustrated in FIG. 1. The user interface is provided by the integrated application 401.

The user can select a printer (a printer driver 400) as an output destination by pressing a printer name key 500 illustrated in FIG. 5. The printer driver 400 can be selected by pressing the printer name key 500 from among various types of the printer drivers that are installed to the data processing apparatuses 100 and 101. An application-dependent setting item 501 is a setting item necessary in generating drawing data (an image) to be transmitted to the printer driver 400 using the integrated application 401. The application-dependent setting item 501 does not depend on the type of the printer driver 400 selected by pressing the printer name key 500. In other words, the application-dependent setting item 501 is set in common to all of the printer drivers 400. The application-dependent setting item 501 includes a page composition item. The user can set a number of pages to be composed on a surface of a sheet by executing a setting of the page composition item.

A printer driver-dependent setting item 502 is a setting item necessary for identifying processing to be executed by the printer driver 400 or the image processing apparatus 102. The printer driver-dependent setting item 502 is dependent on the type of the printer driver 400 selected by the user by pressing the printer name key 500.

The setting items according to the present exemplary embodiment are not limited to those illustrated in FIG. 5. More specifically, a setting item not included in the example illustrated in FIG. 5 may be used as long as it implements any of the functions of the present exemplary embodiment. The printer driver-dependent setting item 502 includes an item for setting a printing method and an item for setting a color mode. For the printing method, the user can select one-sided printing, two-sided printing, and book binding processing.

Figure 6:
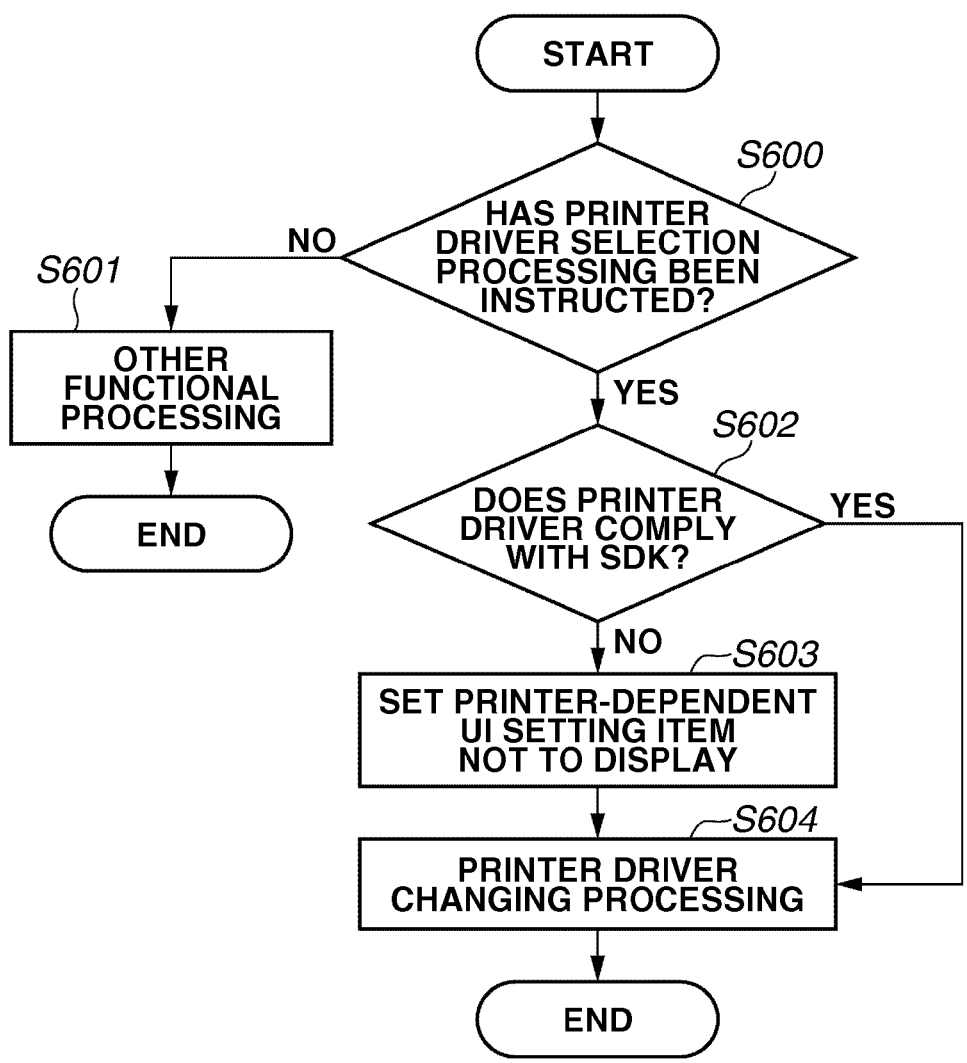
FIG. 6 is a flow chart illustrating an exemplary flow of data processing executed by the data processing apparatus.

FIG. 6 is a flow chart illustrating an exemplary flow of processing executed by the data processing apparatuses 100 and 101 for selecting a printer driver. Each step of the flow chart illustrated in FIG. 6 is implemented by the CPU 201 by loading and executing a program necessary for executing each processing. In addition, unless particularly described otherwise, each step of the flow chart illustrated in FIG. 6 is implemented by calling and executing the integrated application 401.

Referring to FIG. 6, in step S600, the integrated application 401 determines whether a user instruction which is received via the UI (setting screen) illustrated in FIG. 5 and displayed on the display unit 202 is an instruction to select the printer driver.

If it is determined that the received user instruction is not the instruction to select the printer driver (NO in step S600), then the processing advances to step S601. In step S601, the integrated application 401 executes another processing instructed by the user. Then, the processing ends. On the other hand, if it is determined that the received user instruction is the instruction to select the printer driver (YES in step S600), then the processing advances to step S602. In step S602, the integrated application 401 determines whether the printer driver selected by the user can appropriately receive the print setting information input by the integrated application 401.

More specifically, in step S602, the integrated application 401 executes an inquiry to the selected printer driver using the printer driver SDK 402 to acquire version information stored by the printer driver. The integrated application 401 executes the determination processing in step S602 according to the acquired version information. For example, the determination processing in step S602 can be implemented by the integrated application 401 by determining whether a version included in the version information is later than a predetermined version.

If it is determined that the selected printer driver can appropriately receive the print setting information input by the integrated application 401 (YES in step S602), then the print setting information set using the integrated application 401 is correctly applied in a print product resulting from executing the print job generated by the printer driver.

On the other hand, if it is determined that the selected printer driver cannot appropriately receive the print setting information input by the integrated application 401 (NO in step S602), then the print setting information set using the integrated application 401 may not be correctly applied in a print product resulting from executing the print job generated by the printer driver.

Accordingly, it cannot be determined that the selected printer driver can appropriately receive the print setting information input by the integrated application 401 just because the print setting information output from the integrated application 401 is stored on the memory for the printer driver.

If it is determined that the selected printer driver cannot appropriately receive the print setting information input by the integrated application 401 (NO in step S602), then the processing advances to step S603. In step S603, the integrated application 401 displays a setting screen on which the printer driver-dependent setting items 502 are not displayed.

Figure 7:
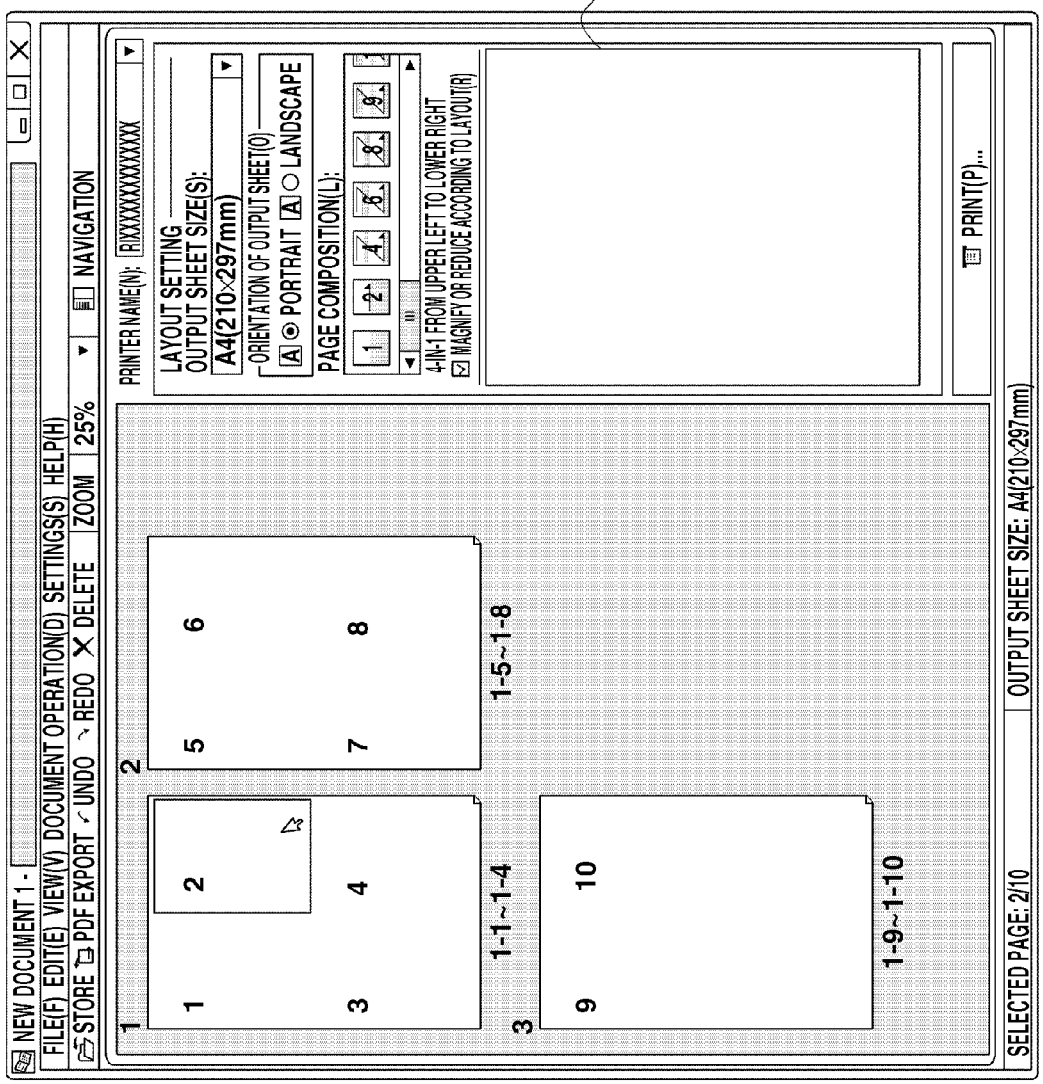
FIG. 7 illustrates an example of a UI that can be displayed by the data processing apparatus.

FIG. 7 illustrates an example of a user interface 700 which is displayed when the processing in step S603 is executed. On the user interface 700, the printer driver-dependent setting items 502 are not displayed.

In step S604, the integrated application 401 sets the printer driver selected by the user in step S600. According to the present exemplary embodiment, when the printer driver that cannot appropriately receive the print setting information input by the integrated application 401 has been selected, the driver-dependent setting items are not displayed (i.e., not allowed for the user to set) on the setting screen provided by the integrated application 401, so that the user can be saved from getting confused.

In the flow chart illustrated in FIG. 6, the processing starts in a state where both application-dependent setting items and the printer driver-dependent setting items are displayed. However, the present exemplary embodiment is not limited to this configuration. More specifically, the processing in the flow chart of FIG. 6 may start in a state where the printer driver-dependent setting items are not displayed.

Figure 8:
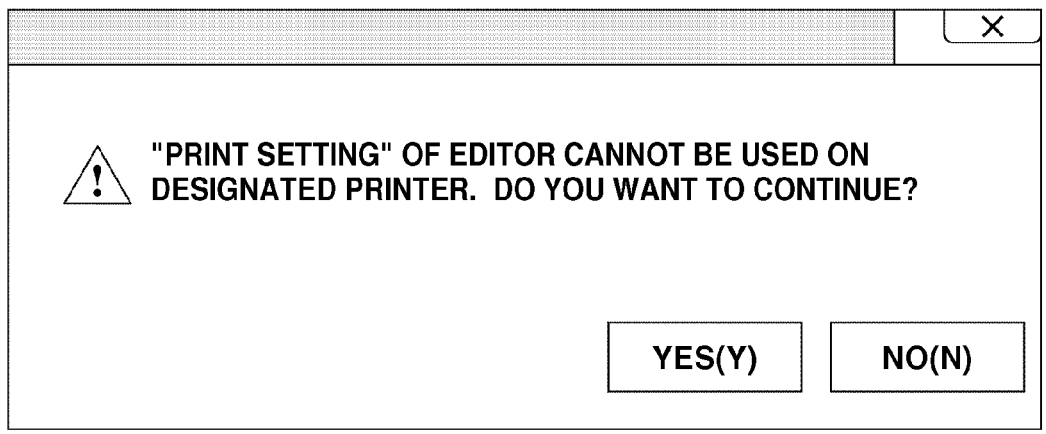
FIG. 8 illustrates an example of a UI that can be displayed by the data processing apparatus.

In this case, if the printer driver that can appropriately receive the print setting information input by the integrated application 401 has been selected, the UI including the printer driver-dependent setting items may be displayed. It is also useful if a message illustrated in FIG. 8 is displayed after the processing in step S602 is executed to allow the user to select whether to execute processing for displaying the printer driver-dependent setting items.

Further, in the example illustrated in FIG. 6, the printer driver-dependent setting items are not displayed. However, the present exemplary embodiment is not limited to this configuration. More specifically, the printer driver-dependent setting items may be merely grayed out or set in a state that an operation by the user is not accepted.

Now, print processing executed by the data processing apparatuses 100 and 101 will be described in detail below with reference to FIG. 5 and FIGS. 9 through 11. The example of the setting screen illustrated in FIG. 5 is as described above and the description thereof will not be repeated here.

Figure 9:
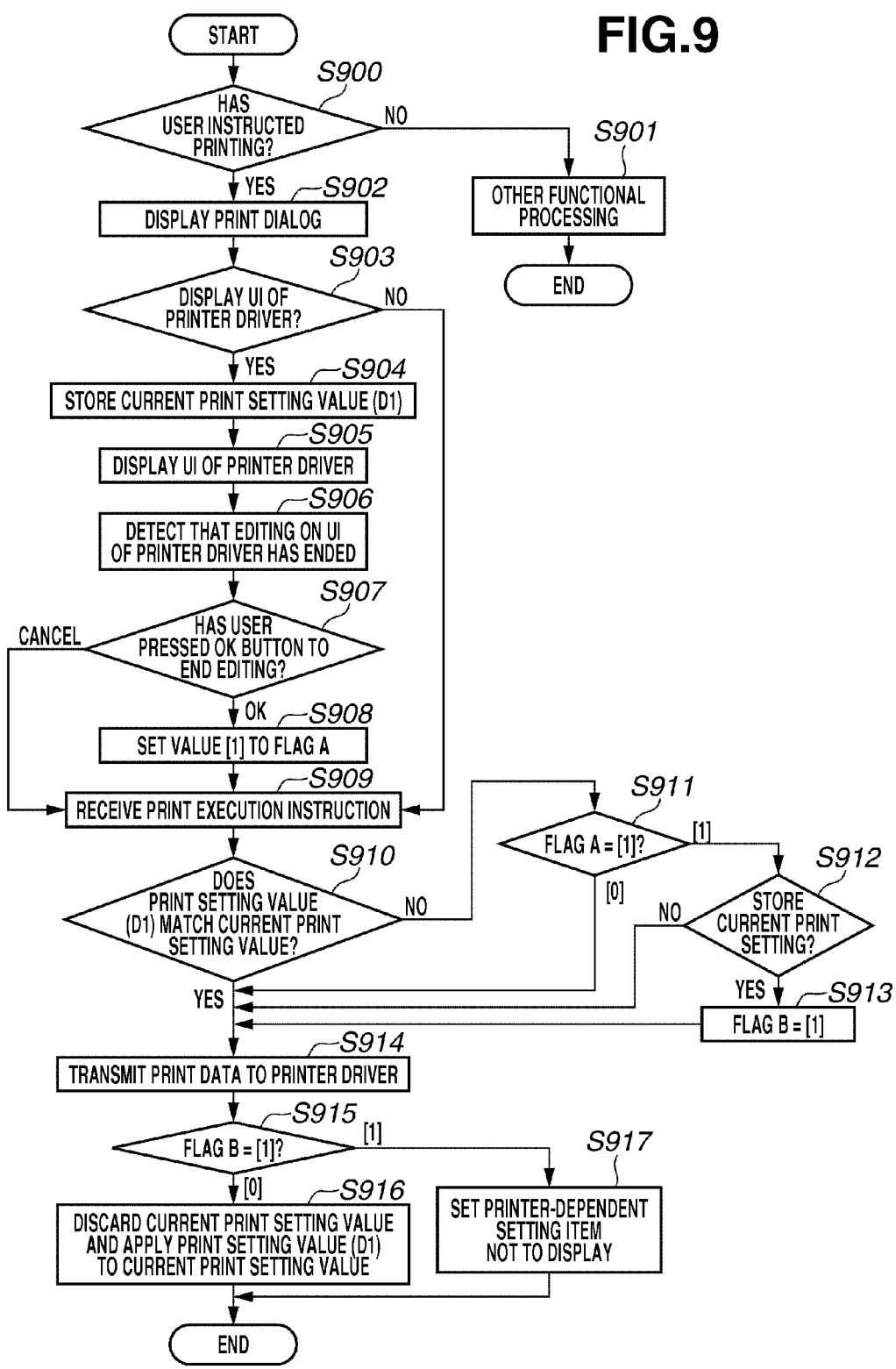
FIG. 9 is a flow chart illustrating an exemplary flow of data processing executed by the data processing apparatus.

FIG. 9 is a flow chart illustrating an exemplary flow of print processing executed by the data processing apparatuses 100 and 101. More specifically, the print processing illustrated in FIG. 9 is executed using the integrated application 401.

Referring to FIG. 9, in step S900, the integrated application 401 determines whether an instruction input via a screen which is provided by the integrated application 401 and displayed on the display unit 202 is an instruction to execute print processing. If it is determined that the input instruction is not the instruction to execute print processing (NO in step S900), then the processing advances to step S901. In step S901, the integrated application 401 executes processing according to another user instruction. Then, the processing ends.

Figure 10:
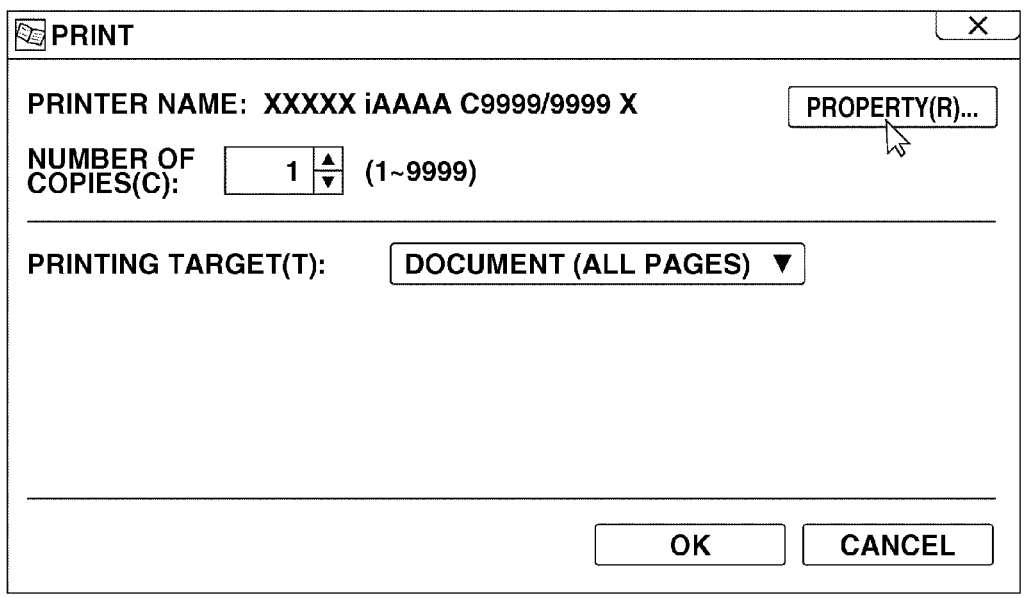
FIG. 10 illustrates an example of a UI that can be displayed by the data processing apparatus.

On the other hand, if it is determined that the input instruction is the instruction to execute print processing (YES in step S900), then the processing advances to step S902. In step S902, the integrated application 401 displays a print dialog on the display unit 202 as a sub dialog of the integrated application 401. FIG. 10 illustrates an example of the print dialog.

In step S903, the integrated application 401 determines whether an instruction to display the UI of the printer driver has been input. More specifically, in step S903, the integrated application 401 determines whether a property button illustrated in FIG. 10 has been pressed by the user. If it is determined that the input user instruction is not the instruction to display the UI of the printer driver (NO in step S903), then the processing advances to step S909.

On the other hand, if it is determined that the input user instruction is the instruction to display the UI of the printer driver (YES in step S903), then the processing advances to step S904. In step S904, the integrated application 401 temporarily stores the print setting information set by the user via the setting screen illustrated in FIG. 5 (i.e., DEVMODE in the printing system of Windows (registered trademark) of Microsoft Corporation) on the ROM 204 as print setting information "D1".

In step S905, the integrated application 401 sets the print setting information set in step S904 via the printer driver SDK 402 to the printer driver. Further, the integrated application 401 instructs the printer driver to display the UI of the printer driver. However, for the setting item that is not included in the integrated application 401 but displayed on the UI of the printer driver, an initial value of the printer driver is used.

Figure 11:
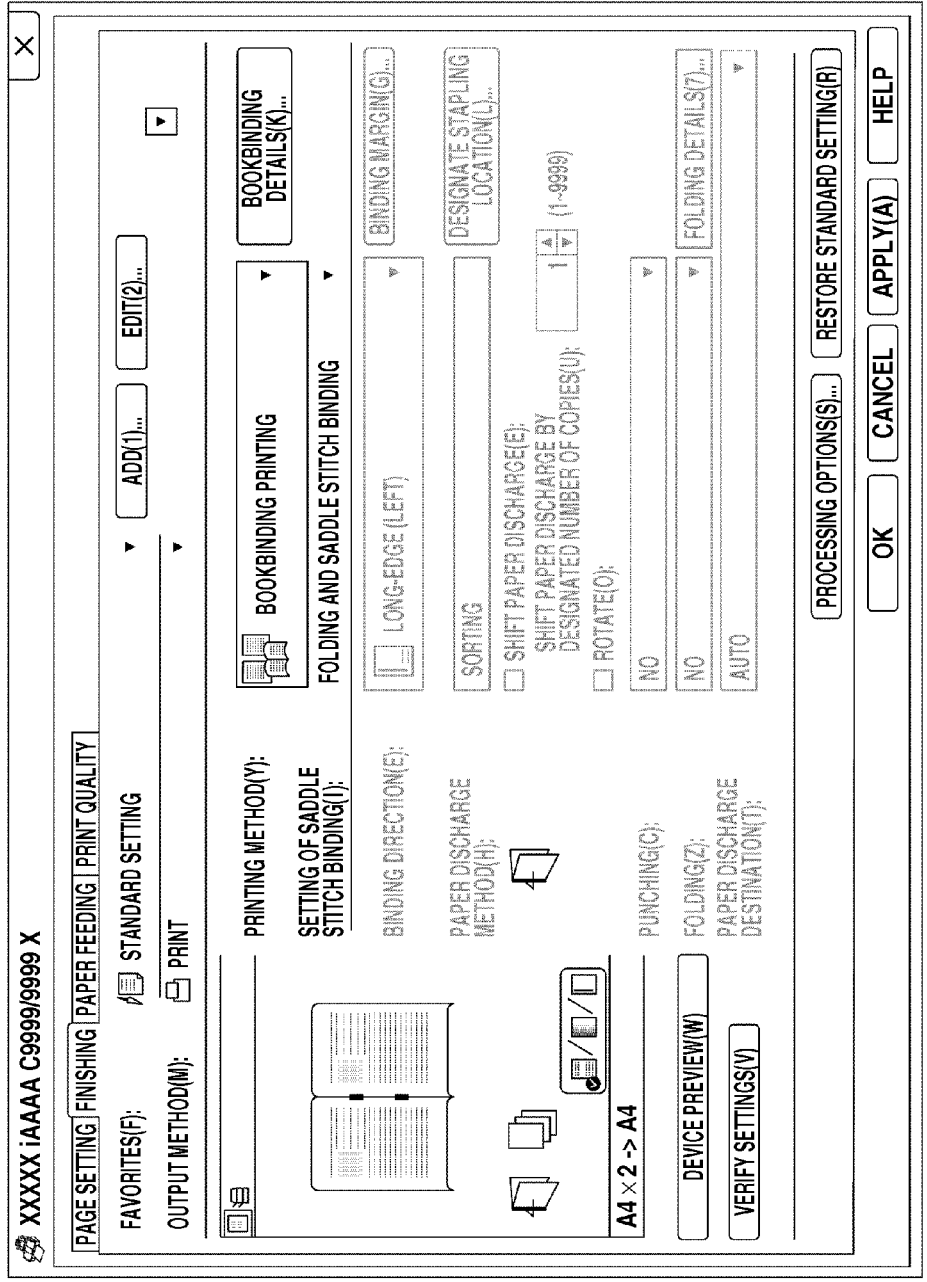
FIG. 11 illustrates an example of a UI that can be displayed by the data processing apparatus.

FIG. 11 illustrates an example of the UI of the printer driver. The UI of the printer driver is provided by various printer drivers. The print setting information for the function that can be implemented by the image processing apparatus 102 to which the printer driver 400 is connected is set. The UI of the printer driver is not managed or controlled by the integrated application 401. Accordingly, an instruction input via the UI of the printer driver cannot be detected using the integrated application 401. It is only detected using the integrated application 401 that the UI of the printer driver has been closed by the user by pressing an OK button (a button for finally applying the setting) or a cancel button (a button for canceling the once set setting).

In step S906, the integrated application 401 detects that the UI of the printer driver has been closed. In step S907, the integrated application 401 determines whether the UI of the printer driver has been closed by pressing the OK button.

If it is determined that the UI of the printer driver has been closed by pressing the cancel button ("cancel" in step S907), then the processing advances to step S909. On the other hand, if it is determined that the UI of the printer driver has been closed by pressing the OK button ("OK" in step S907), then the processing advances to step S908. In step S908, in order to store information which has been set when the UI of the printer driver 400 was closed, the integrated application 401 sets a parameter value "[1]" to a flag A and temporarily stores the information and the parameter value of the flag A on the ROM 204.

In step S909, the integrated application 401 starts the print processing according to the instruction input via the print dialog. In step S910, the integrated application 401 loads the print setting information D1 which has been stored in step S904 from the ROM 204. In addition, the integrated application 401 compares the loaded print setting information D1 with the current print setting information set using the printer driver to determine whether the print setting information D1 is the same as the currently set print setting information.

If it is determined that the print setting information D1 is the same as the currently set print setting information (YES in step S910), then the processing advances to step S914. On the other hand, if it is determined that the print setting information D1 is not the same as the currently set print setting information (NO in step S910), then a message indicating that the print setting information has been changed is displayed on the UI of the printer driver illustrated in FIG. 11.

In step S911, the integrated application 401 determines whether the value of the flag A which has been stored in step S908 is "[1]". If it is determined that the value of the flag A stored in step S908 is "[0]", then the processing advances to step S914. On the other hand, if it is determined that the value of the flag A stored in step S908 is "[1]", then the processing advances to step S912. The processing for determining the value of the flag A is executed considering a case where the print setting information was changed while the UI of the printer driver has been closed by pressing the cancel button.

Figure 12:
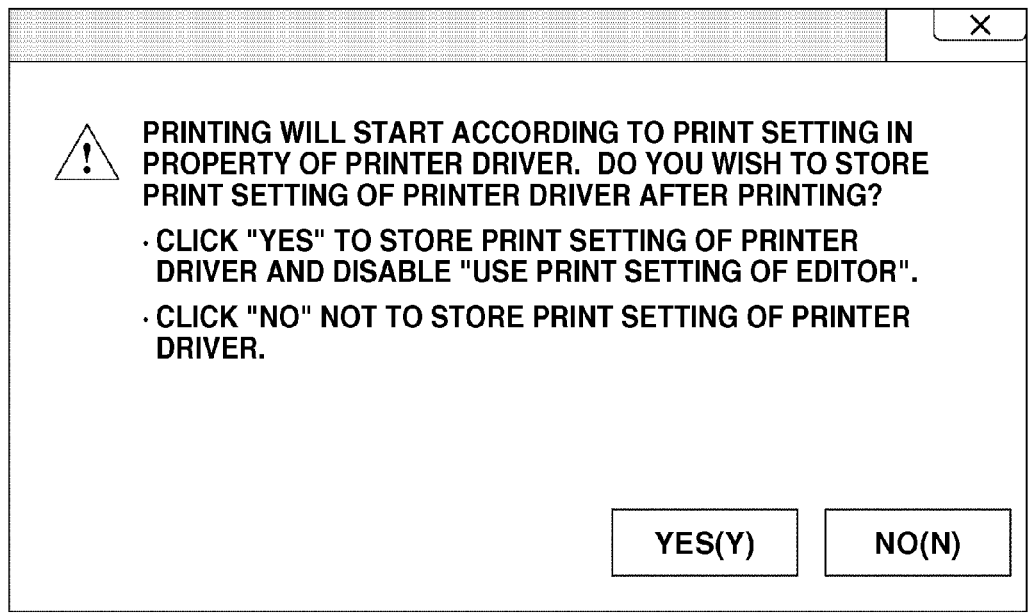
FIG. 12 illustrates an example of a UI that can be displayed by the data processing apparatus.

In step S912, the integrated application 401 displays a message illustrated in FIG. 12. If the print setting information has been changed via the UI of the printer driver illustrated in FIG. 11, print setting information that cannot be controlled by the integrated application 401 may have been added.

The integrated application 401 uses the message illustrated in FIG. 12 to notify the user that if the user intends to use the current print setting information that has been set via the UI of the printer driver illustrated in FIG. 11 after executing printing, the printer driver-dependent setting items of the integrated application 401 are not to be displayed.

Based on an instruction by the user input from the message illustrated in FIG. 12 displayed on the display unit 202, if the integrated application 401 determines that the instruction input by the user is "to store the current print setting information" (YES in the message in FIG. 12, and YES in step S912), then the processing advances to step S913. In this case, the print setting information set by the printer driver and the print setting information for the application-dependent setting item 501 which has been set by the integrated application 401 are stored.

On the other hand, based on the instruction by the user input from the message illustrated in FIG. 12 displayed on the display unit 202, if the integrated application 401 determines that the instruction input by the user is not "to store the current print setting information" (NO in the message in FIG. 12 and NO in step S912), then the processing advances to step S914. In this case, the application-dependent setting item 501 which has been set by the integrated application 401, and the print setting information for the printer driver-dependent setting item 502 are stored while the print setting information set by the printer driver is not stored.

In order to store the information indicating that the user instruction input via the screen illustrated in FIG. 12 is the instruction "to store the current print setting", the integrated application 401 sets a parameter value "[1]" to a flag B. In addition, the integrated application 401 temporarily stores the information and the parameter value of the flag B on the ROM 204.

In step S914, the integrated application 401 transmits drawing data (e.g., graphic device interface (GDI)) of a page image and various pieces of the print setting information to the printer driver. The drawing data transmitted by the integrated application 401 to the printer driver includes a layout setting set via the setting screen.

More specifically, if 4-in-1 printing has been set as illustrated in FIG. 7, the integrated application 401 transmits drawing data in which data of first through fourth pages is laid out. When transmission of the data and print setting information to the printer driver is completed, the printer driver converts the received drawing data and print setting into a page description language (PDL) command (print job) and transfers the converted PDL command to the image processing apparatus 102.

In the present exemplary embodiment, data before generating a print job can be used as the drawing data. Thus, enhanced metafile (EMF) data or extended markup language (XML) paper specification (XPS) data can be used as the drawing data.

Figure 13:
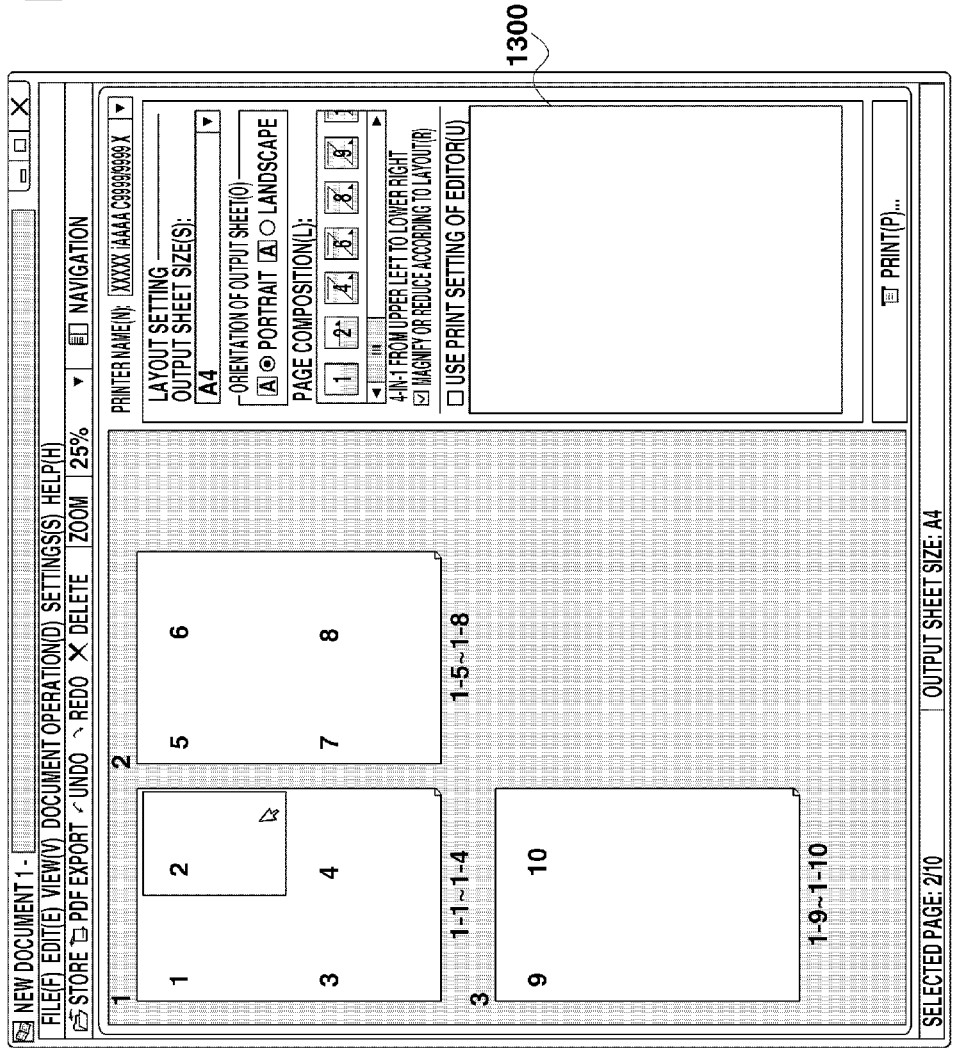
FIG. 13 illustrates an example of a UI that can be displayed by the data processing apparatus.

Regardless of which of "YES" or "NO" is pressed by the user on the screen illustrated in FIG. 12, the same drawing data and various pieces of the print setting information are transmitted by the integrated application 401. The user instruction input by pressing "YES" or "NO" on the screen illustrated in FIG. 12 is used to determine which of the screen illustrated in FIG. 5 or the screen illustrated in FIG. 13 is to be displayed after the screen illustrated in FIG. 12 is closed.

After the drawing data is completely transmitted to the printer driver, the processing advances to step S915. In step S915, the integrated application 401 determines whether the value of the flag B which has been stored in step S913 is "[1]". If it is determined that the value of the flag B is "[0]", then the processing advances to step S916. On the other hand, if it is determined that the value of the flag B is "[1]", then the processing advances to step S917.

In step S916, the integrated application 401 discards the current print setting information and sets the print setting information "D1" which has been loaded from the ROM 204 as the current print setting information. Then, the integrated application 401 displays the UI illustrated in FIG. 5.

Because the print setting information "D1" is the print setting information that has been set at the time of start of the processing illustrated in FIG. 9, the print setting information is set back to the print setting information set at the start of the processing after the printing is completed.

In step S917, the integrated application 401 displays a setting screen on which the printer driver-dependent setting items 502 are not displayed. FIG. 13 illustrates an example of a user interface 1300 on which the printer driver-dependent setting items 502 are not displayed. According to the present exemplary embodiment having the configuration described above, the printer driver-dependent setting items 502 of the integrated application 401 are not displayed (i.e., not allowed for the user to set) when the print setting information that cannot be controlled by the integrated application 401 has been set via the UI of the printer driver and applied. Accordingly, the present exemplary embodiment can save the user from getting confused in the above-described case.

With the above described configuration, the present exemplary embodiment enables the user to set print setting information using the application without confusing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-176613 filed Jul. 29, 2009, which is hereby incorporated by reference herein in its entirety.

What is claimed is:

1. A data processing apparatus comprising:
a selection unit configured to select a printer driver from among a plurality of printer drivers; and
a display control unit configured, if the selected printer driver satisfies a predetermined condition, to display a first setting screen receiving both a setting value of a first setting item which does not depend upon the printer driver and a setting value of a second setting item which depends upon the printer driver, while, if the selected printer driver does not satisfy the predetermined condition, the display control unit is configured to display a second setting screen receiving the setting value of the first setting item and not receiving the setting value of the second setting item,
wherein the display control unit is configured to further display a setting screen receiving the setting value of the first setting item and not receiving the setting value of the second setting item in a state that the printer driver satisfying the predetermined condition is selected, if a setting value is set by using a driver setting screen of the selected printer driver after the first setting screen is displayed.

2. The data processing apparatus according to claim 1, wherein the second setting item includes an item for setting print setting information related to a printing method for identifying which of two-sided printing, one-sided printing, and book binding processing is to be executed, an item for setting print setting information related to post-processing, and an item for setting print setting information related to a color mode, and
wherein the first setting item includes an item for setting print setting information related to a layout of a print product which indicates a number of pages to be laid out on a surface of a printing sheet.

3. The data processing apparatus according to claim 1, wherein, if print setting information is changed by the printer driver and if it is instructed to store the changed print setting information, the second setting screen receiving the setting value of the first setting item and not receiving the setting value of the second setting item is displayed.

4. A method for executing control, the method comprising:
selecting a printer driver from among a plurality of printer drivers;
displaying, if the selected printer driver satisfies a predetermined condition, a first setting screen receiving both a setting value of a first setting item which does not depend upon the printer driver and a setting value of a second setting item which depends upon the printer driver;
displaying, if the selected printer driver does not satisfy the predetermined condition, a second setting screen receiving the setting value of the first setting item and not receiving the setting value of the second setting item; and
further displaying a setting screen receiving the setting value of the first setting item and not receiving the setting value of the second setting item in a state that the printer driver satisfying the predetermined condition is selected, if a setting value is set by using a driver setting screen of the selected printer driver after the first setting screen is displayed.

5. The method according to claim 4, wherein the second setting includes an item for setting print setting information related to a printing method for identifying which of two-sided printing, one-sided printing, and book binding processing is to be executed, an item for setting print setting information related to post-processing, and an item for setting print setting information related to a color mode, and
wherein the first setting item includes an item for setting print setting information related to a layout of a print product which indicates a number of pages to be laid out on a surface of a printing sheet.

6. The method according to claim 4, further comprising displaying the second setting screen receiving the setting value of the first setting item and not receiving the setting value of the second setting item if print setting information is changed by the printer driver and if it is instructed to store the changed print setting information.

7. A non-transitory computer-readable storage medium storing a program which is executed by a data processing apparatus, the program causing the data processing apparatus to perform operations comprising:
selecting a printer driver from among a plurality of printer drivers;
displaying, if the selected printer driver satisfies a predetermined condition, a first setting screen receiving both a setting value of a first setting item which does not depend upon the printer driver and a setting value of a second setting item which depends upon the printer driver;
displaying, if the selected printer driver does not satisfy the predetermined condition, a second setting screen receiving the setting value of the first setting item and not receiving the setting value of the second setting item; and
further displaying a setting screen receiving the setting value of the first setting item and not receiving the setting value of the second setting item in a state that the printer driver satisfying the predetermined condition is selected, if a setting value is set by using a driver setting screen of the selected printer driver after the first setting screen is displayed.

8. The non-transitory computer-readable storage medium according to claim 7, wherein the second setting item includes an item for setting print setting information related to a printing method for identifying which of two-sided printing, one-sided printing, and book binding processing is to be executed, an item for setting print setting information related to post-processing, and an item for setting print setting information related to a color mode, and
wherein the first setting item includes an item for setting print setting information related to a layout of a print product which indicates a number of pages to be laid out on a surface of a printing sheet.

9. The non-transitory computer-readable storage medium according to claim 7, the program causing the data processing apparatus to perform operations further comprising displaying the second setting screen receiving the setting value of the first setting item and not receiving the setting value of the second setting item if print setting information is changed by the printer driver and if it is instructed to store the changed print setting information.

10. The data processing apparatus according to claim 1, wherein whether or not the selected printer driver satisfies the predetermined condition depends upon version information of the selected printer driver.

11. The data processing apparatus according to claim 1, wherein, if the selected printer driver satisfies the predetermined condition, a screen including the first setting screen receiving both the setting value of the first setting item and the setting value of the second setting item, and a preview image are displayed.

12. The data processing apparatus according to claim 1, wherein, if the selected printer driver does not satisfy the predetermined condition, the display control unit displays the second setting screen where the first setting item is displayed but the second setting item is not displayed after a message indicating that the selected printer driver does not satisfy the predetermined condition is displayed.

13. The method according to claim 4, wherein whether or not the selected printer driver satisfies the predetermined condition depends upon version information of the selected printer driver.

14. The method according to claim 4, further comprising, if the selected printer driver satisfies the predetermined condition, displaying a screen including the first setting screen receiving both the setting value of the first setting item and the setting value of the second setting item, and a preview image.

15. The method according to claim 4, further comprising, if the selected printer driver does not satisfy the predetermined condition, displaying the second setting screen where the first setting item is displayed but the second setting item is not displayed after a message indicating that the selected printer driver does not satisfy the predetermined condition is displayed.

16. The non-transitory computer-readable storage medium according to claim 7, wherein whether or not the selected printer driver satisfies the predetermined condition depends upon version information of the selected printer driver.

17. The non-transitory computer-readable storage medium according to claim 7, the program causing the data processing apparatus to perform operations further comprising, if the selected printer driver satisfies the predetermined condition, displaying a screen including the first setting screen receiving both the setting value of the first setting item and the setting value of the second setting item, and a preview image.

18. The non-transitory computer-readable storage medium according to claim 7, the program causing the data processing apparatus to perform operations further comprising, if the selected printer driver does not satisfy the predetermined condition, displaying the second setting screen where the first setting item is displayed but the second setting item is not displayed after a message indicating that the selected printer driver does not satisfy the predetermined condition is displayed.

* * * * *